(12) United States Patent
Steury

(10) Patent No.: US 9,376,041 B2
(45) Date of Patent: Jun. 28, 2016

(54) HIGH TORQUE-BEARING ARMREST FOR FURNITURE PIECE

(71) Applicant: D.R.S., CO., LLC, New Paris, IN (US)

(72) Inventor: Douglas V. Steury, New Paris, IN (US)

(73) Assignee: D.R.S. Co., LLC, New Paris, IN (US)

( * ) Notice: Subject to any disclaimer, the term of this patent is extended or adjusted under 35 U.S.C. 154(b) by 63 days.

(21) Appl. No.: 14/475,692

(22) Filed: Sep. 3, 2014

(65) Prior Publication Data

US 2016/0059753 A1 Mar. 3, 2016

(51) Int. Cl.
*B60N 2/46* (2006.01)
*A47C 7/54* (2006.01)

(52) U.S. Cl.
CPC ............... *B60N 2/4633* (2013.01); *A47C 7/54* (2013.01); *B60N 2/464* (2013.01)

(58) Field of Classification Search
CPC ............ A47C 1/03; A47C 7/543; A47C 7/54; B60N 2/4633; B60N 2/464
USPC ............. 297/411.31, 411.39, 411.38, 411.32; 403/294, 165, 381, 383
See application file for complete search history.

(56) References Cited

U.S. PATENT DOCUMENTS

| | | | |
|---|---|---|---|
| 2,692,638 A * | 10/1954 | Castell | B60N 2/4673 108/44 |
| 3,399,605 A * | 9/1968 | Landers | E21B 17/05 192/69.71 |
| 3,991,146 A | 11/1976 | Barrie | |
| 6,375,265 B1 | 4/2002 | Hubner | |
| 6,382,726 B2 | 5/2002 | Bullesbach | |
| 7,140,688 B2 * | 11/2006 | Hann | B60N 2/4606 297/411.32 |
| 8,157,322 B2 | 4/2012 | Daisuke | |
| 8,215,137 B2 | 7/2012 | Ripley et al. | |
| 8,328,286 B2 | 12/2012 | Steury | |
| 9,108,549 B2 * | 8/2015 | Thurow | B60N 2/4633 |
| 2006/0225361 A1 | 10/2006 | Scheer | |
| 2007/0140789 A1 * | 6/2007 | Meggiolan | B62M 3/00 403/383 |
| 2014/0175850 A1 * | 6/2014 | Roeglin | B60N 2/4606 297/411.38 |

FOREIGN PATENT DOCUMENTS

CZ WO2012171509 A2 12/2012
JP 3001228 U 8/1999

* cited by examiner

*Primary Examiner* — Milton Nelson, Jr.
(74) *Attorney, Agent, or Firm* — Michael A. Myers; Myers & Associates

(57) ABSTRACT

A journaled armrest for a furniture piece includes an arm with, a hollow bearing portion with a rigid inner journal member. The journal member has a torque-bearing end and a connecting end. The connecting end is adapted to be connected to a seatback of a furniture piece. The torque-bearing end has three equally spaced planar surfaces formed in each of first and second annular portions. Each planar surface has an indention formed in it. The armrest is cast by way of injection molding around the journal member so that each of the equally spaced planar surfaces is parallel to an interior wall of the bearing portion. The new armrest is lightweight and capable of withstanding extreme amounts of torque without shearing at the connecting end.

13 Claims, 4 Drawing Sheets

HIGH TORQUE-BEARING ARMREST FOR FURNITURE PIECE

BACKGROUND OF THE INVENTION

The invention relates generally to articles of furniture and, more particularly, to a high torque-hearing armrest for a furniture piece.

DESCRIPTION OF THE PRIOR ART

The demand for seats with armrests has increased. Besides use in the home, seats with armrests are now preferred onboard RVs, boats and vehicles. The functional life of these chairs, sofas, recliners and the like are often determined by how long the armrest holds up. Pivoting armrests that are connected to the seatback in vehicle and marine seating applications, for example, often shear at their bearing points and break. The failure is common because the armrests are used as handholds. People also sit on them. Since the armrest acts as a lever, the torque applied to the point of attachment can be quite substantial depending upon the length of the arm.

Notably, manufacturing plastics from which armrests may be inexpensively produced cannot adequately handle the shear stresses described. Air contaminates injection, molding processes, and babbles often, result, winch adds to the problem. Armrests formed from steel, on the other hand, are expensive to manufacture and ship and require more assembly and machining steps. Manufacturing economics, including assembly steps like application of loam padding and upholstery, therefore, favor the use of plastics. Foam, for example, can bettor adhere to the plastic armrest since the armrest may be molded to contain negative spaces like a honeycomb where the foam can penetrate and better adhere.

Additionally, a variety of armrests have been employed, including some that have self-leveling arms. U.S. Pat. No. 8,328,286 discloses one example of a self-leveling armrest for a furniture piece and is herewith incorporated by reference on the structure of one such armrest assembly. The assembly includes a seatback with an arm support. An armrest is connected to the arm support, and the armrest has a pin at one end and at least one dowel extending from the pin. Linkage connects the seat and seatback. The linkage carries a cross pin. The dowel contacts the cross pin to support and direct movement of the armrest.

SUMMARY OF THE INVENTION

One embodiment of the invention is an armrest for a furniture piece. The armrest includes an arm with a hollow bearing portion with a rigid inner journal member. The journal member has a torque-bearing end and a connecting end. The connecting end is adapted to be rotatably connected to a seatback so the arm may rotate relative to the seatback. The torque-hearing end is shaped to include at least one planar surface that is parallel to an interior wall of the bearing portion of the arm to reduce shear stress between the external surface of the journal member and the interior surface of the bearing portion when force is applied to the arm.

In another embodiment, the invention is a rigid journal member for reducing shear stress within a hollow of a bearing portion of an armrest rotatably connected to a seatback of a furniture piece. The journal member includes a rigid body having a torque-bearing end and a connecting end. The connecting end is adapted to be capable of being connected to the seatback of the furniture piece. The torque-bearing end is shaped to include at least one planar surface that is parallel to an interior wall of a hollow bearing portion of the armrest to reduce shear stress between the external surface of the journal member and the interior surface of the hollow bearing portion when force is applied to the armrest. The torque-bearing end has three equally spaced planar surfaces formed in a first annular portion. Each of the surfaces has an indention formed therein.

It is an object of the invention to provide an armrest that resists shear stress at the point where it is attached to the seatback of a furniture piece.

It is an object of the present invention to provide a new and improved armrest for a furniture piece.

It is an object of the invention to strengthen the support of the seatback connection of an armrest that experiences vertical displacement but no angular displacement when the seatback is moved between a forward position and a backward position.

Related objects and advantages of the present invention will be apparent from the following description.

DETAILED DESCRIPTION OF INVENTION

For the purposes of promoting an understanding of the principles of the invention, specific embodiments have been described. It should nevertheless be understood that the description, is intended to be illustrative and not restrictive in character, and that no limitation of the scope of the invention, is intended. Any alterations and farther modifications in the described components, elements, processes, or devices, and any further applications of the principles of the invention as described herein, are contemplated as would normally occur to one skilled in the art to which the invention relates.

Figure 1:
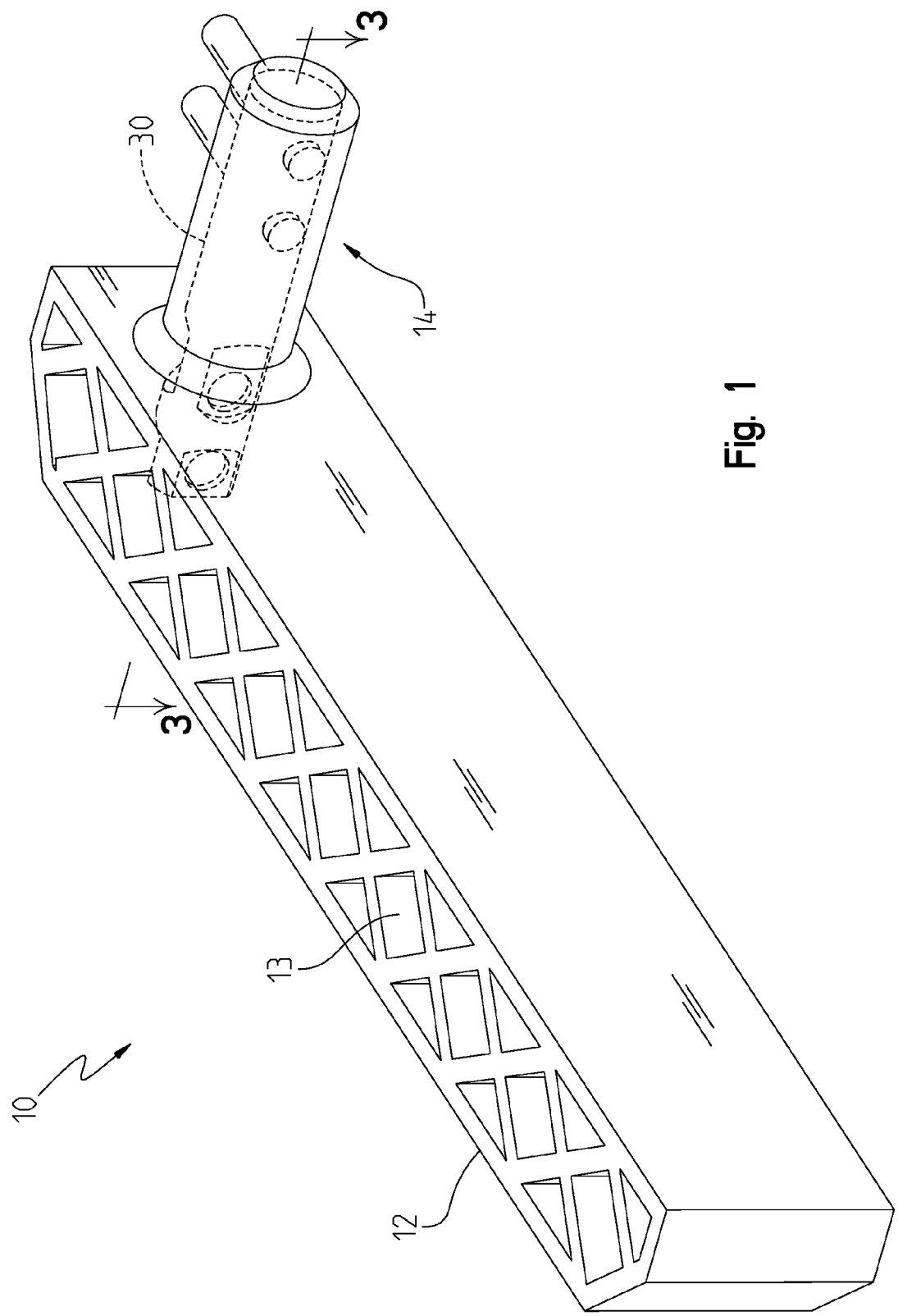
FIG. 1 is an isometric view of an embodiment of the armrest of the invention with the inner journal member shown in phantom lines.
Figure 2:
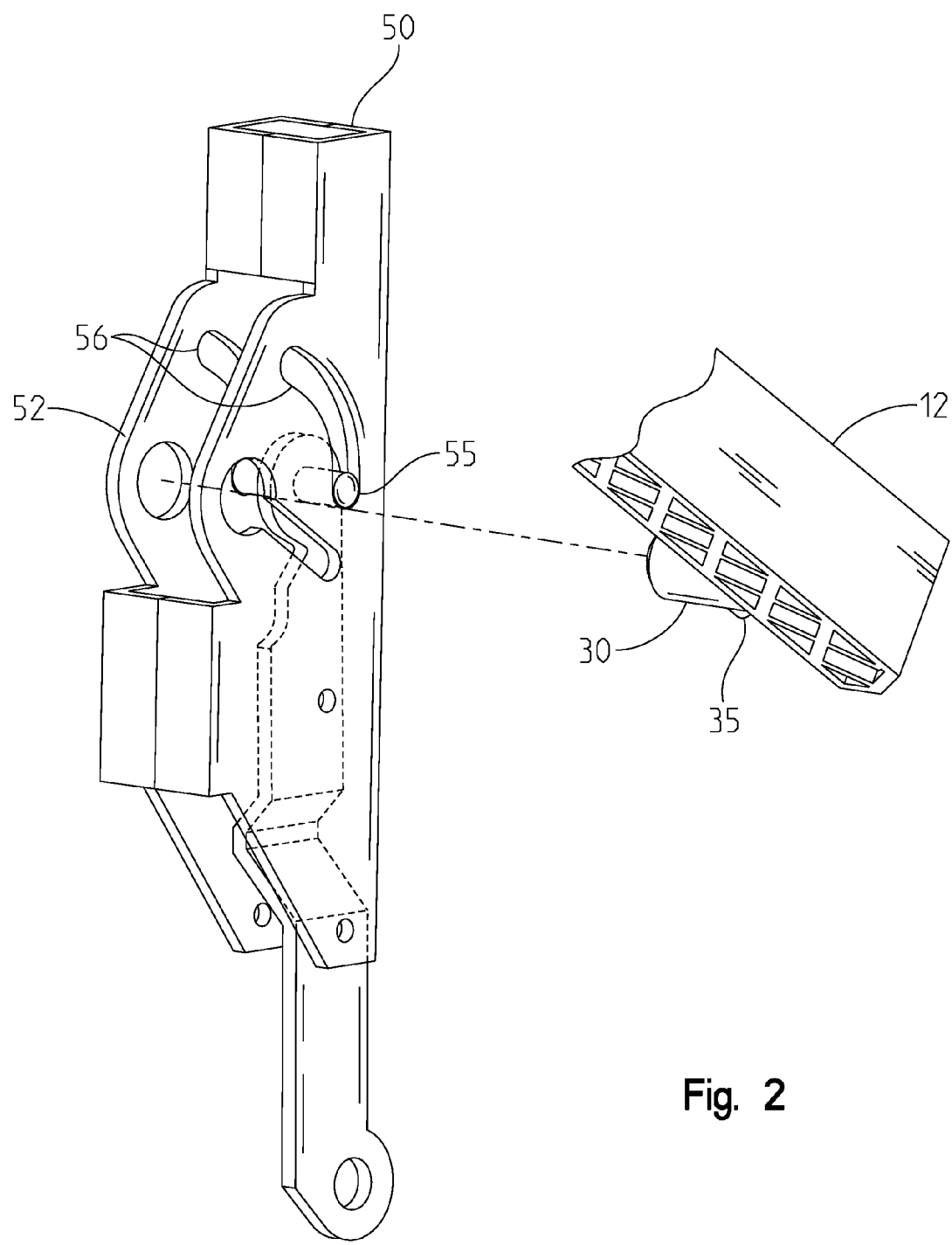
FIG. 2 shows armrest support structure of a seatback disclosed in prior U.S. Pat. No. 8,328,286 and a partial cutaway view of the armrest oriented for insertion into the support structure.
Figure 3:
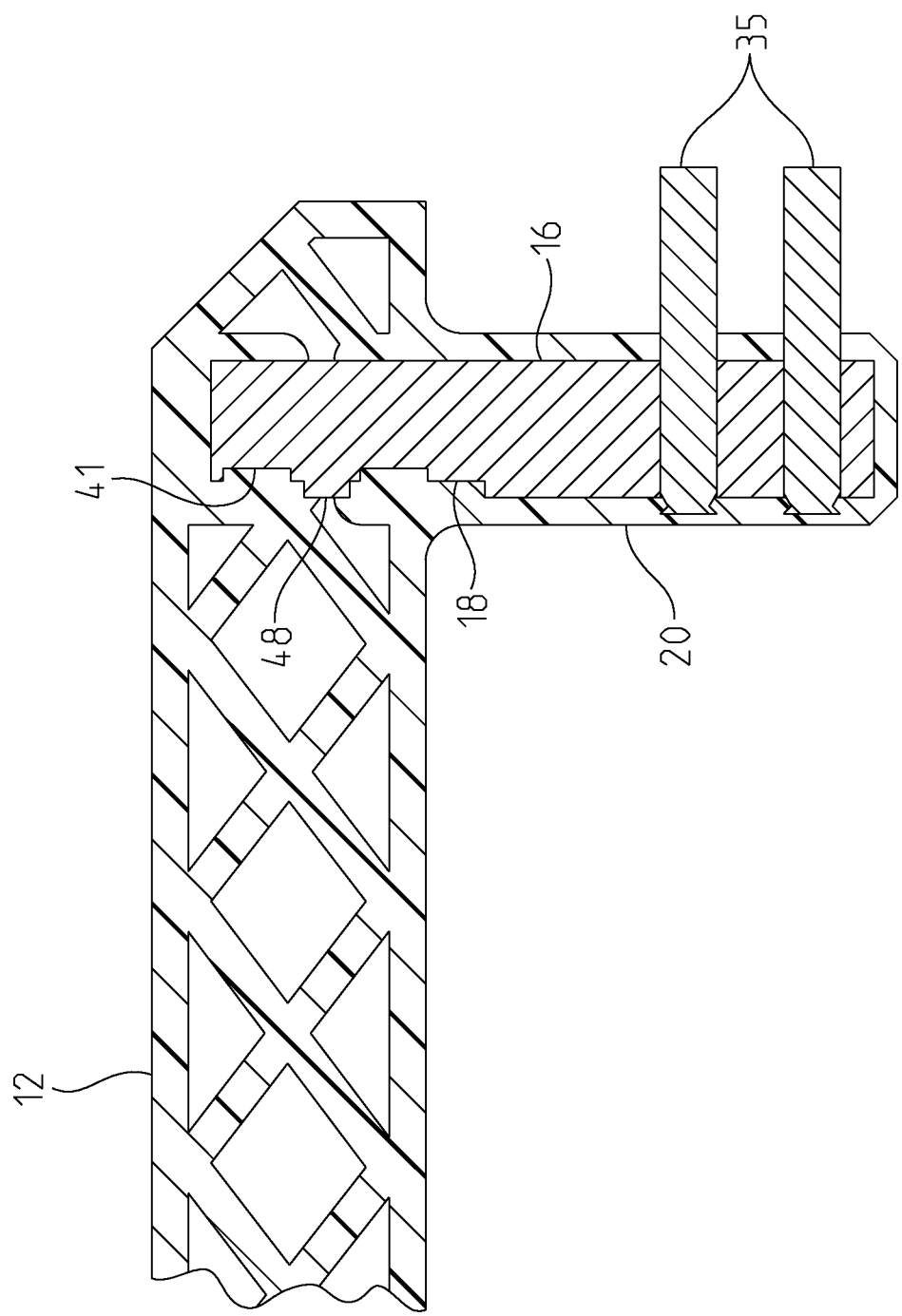
FIG. 3 is a partial cutaway cross sectional view of the armrest taken along line 3-3 of FIG. 1.

With reference to FIGS. 1-3, an armrest 10 for a furniture piece includes an elongate arm 12 with a hollow bearing portion 14 extending outwardly from the arm. The hollow hearing portion includes a cavity 16 with an interior wall 18. In one embodiment, the cavity 16 is defined by an elongate hollow cylinder 20 arranged perpendicular to the long axis of the arm 12. The arm and the bearing portion are preferably integrally east from plastic. A variety of known composite thermoplastics may be employed for manufacture of the arm 12 and bearing portion 14. The cast body arm 12 may include any one of known configurations with negative spaces 13 so that foam padding can adhere to the arm 12.

As shown in FIGS. 1 and 3, a rigid metal journal member 30 is molded inside the hollow bearing portion 14 of the arm 12. The journal member 30 is generally cylindrically shaped, and preferably machined from steel. The journal member has a torque-bearing end 32 and a connecting end 34. The connecting end is adapted to be rotatably connected to a seatback 50 of a furniture piece (not shown) so the armrest 10 may rotate relative to the seatback 50. The prior armrest support structure 52 of FIG. 2 is described in connection with the armrest of U.S. Pat. No. 8,328,286, the prior art structure of which has been incorporated herein fey reference. In that structure, the connecting end 34 of the journal member 30 includes at least one guide element 35, preferably two, for guiding movement of the arm by way of the cross pin 55 lathe cut outs 56 shown in FIG. 2 so that the arm 12 experiences vertical displacement but no angular displacement when the seatback 50 is moved between a forward position and a backward position. The guide element(s) 35 are machined from steel and inserted into bores 37 that extend through the body of the journal member 30.

It should be understood that the connecting end 34 of the journal member 30 of the armrest of the invention is exemplary and may be adapted to accommodate other seatbacks and furniture pieces and their corresponding arm support structures. Many such armrests may neither include guide elements 35 nor be self-adjusting or rotatable, unlike the invention described in the '286 patent, for example.

Figure 4:
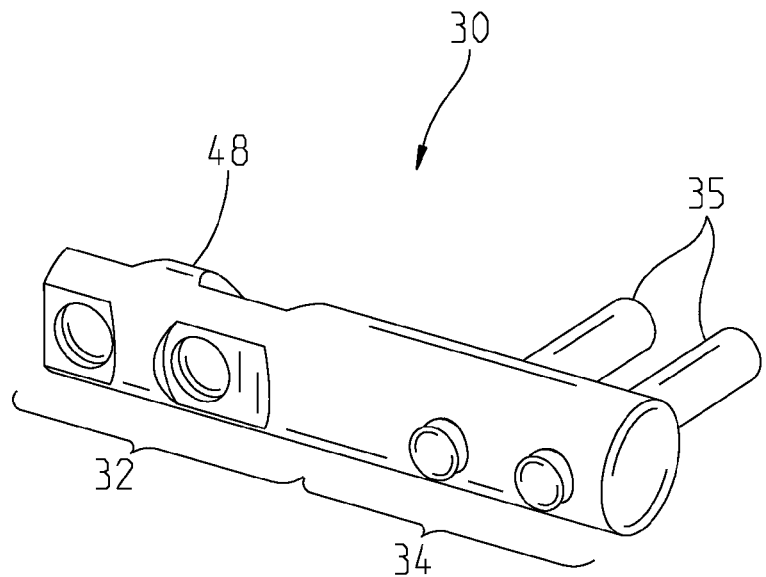
FIG. 4 is an isometric view of an embodiment of the journal member of the invention.
Figure 5:
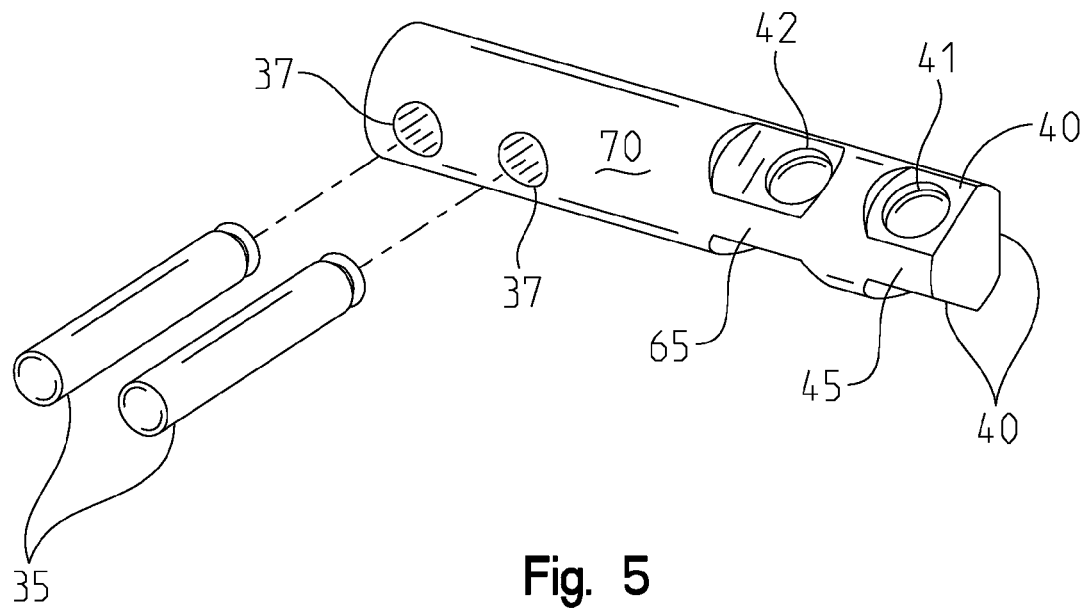
FIG. 5 is another isometric view of an embodiment of the journal member of the invention showing the guide pins removed.

Referring to FIGS. 3-5, in a preferred embodiment, the torque-bearing end 32 of the journal member 30 is shaped to include at least one planar surface 40 that is parallel to the interior wall 18 of the hollow cavity of the arm's bearing portion 14. The planar surface 40 has at least one central indention 41 with an arcuate surface 42. Plastic is injected into the indention(s) 41 during manufacture, which helps optimal bonding of the plastic to the journal member 30. In a more preferred embodiment the torque-bearing end 32 has three equally spaced planar surfaces 40 formed in an annular portion 45, which defines a generally triangular cross section, as best illustrated in FIG. 5. Skilled artisans may recognize other suitable geometric cross section shapes that may be formed in the torque-bearing end 32 to provide additional (or fewer) planar surfaces 40, as desired. Shapes having two straight planar surfaces and polygons are preferred.

Each of the surfaces 40 has an indention 41 formed therein. In the most preferred embodiment, as shown in FIGS. 4-5, the torque-bearing end 32 has six equally spaced planar surfaces 40 three each formed in a first and a second annular portion 45, 65, respectively. In that embodiment, the first and second annular surfaces 45, 65 are separated by a space 48. Each of the surfaces 40 in the first and second annular portions 45, 65 has an indention 41 formed therein.

When force is applied to the arm 12, torque is translated to the attachment point where the armrest 10 turns relative to the furniture piece seatback. It is not uncommon for armrests of the type aboard RVs, boats and vehicles to bear substantial and in some cases extreme forces on their turning points, instead of the plastic experiencing deformation or shearing when torque is applied to its turning point, each of the planar surfaces 40, as well as each arcuate surface 42, mates against a corresponding interior wall 18 that is parallel to it to reduce shear stress between the external surface 70 of the journal member 30 aid the interior surface of the bearing portion 14 when force is applied to the arm 12. Thus, with the steel inner journal member 30, the new armrest 10 is capable of withstanding extreme amounts of torque not possible with plastic alone.

The instant invention provides a lightweight plastic armrest 10 that is less expensive to produce and ship than steel. Only one part, the journal member 30, needs to be machined, which reduces man-hours and production costs.

While the invention has been illustrated and described in detail in the drawings and foregoing description, the same is to be considered illustrative and not restrictive in character. It is understood that the embodiments have been shown and described in die foregoing specification in satisfaction of the best mode and enablement requirements. It is understood that one of ordinary skill in the art could readily make a nearly infinite number of insubstantial changes and modifications to the above-described embodiments, including different geometric shapes to the torque-bearing end of the journal member, and that it would be impractical to attempt to describe all such embodiment variations in the present specification. Thus, it is understood that it is desirable to protect all the changes and modifications that come within the spirit of the invention.

The invention claimed is:

1. An armrest for a furniture piece comprising:
   an arm having an integrally cast hollow bearing portion with a rigid inner journal member, the journal member has a torque-bearing end and a connecting end, the connecting end is adapted to be rotatably connected to a seatback of a furniture piece so the arm may rotate relative to the seatback, and the torque-bearing end is shaped to include at least one planar surface that is parallel to an interior wall of the bearing portion to reduce shear stress between the external surface of the journal member and the interior surface of the bearing portion when force is applied to the arm.

2. An armrest according to claim 1, wherein the connecting end of the journal member includes at least one guide element for guiding movement of the arm so that the arm experiences vertical displacement but no angular displacement when the seatback is moved between a forward position and a backward position.

3. An armrest according to claim 1, wherein the torque-bearing end of the journal member has at least one indention with an arcuate surface.

4. An armrest according to claim 3, wherein the arm and the bearing portion are integrally cast from plastic.

5. A rigid journal member for reducing shear stress within a hollow of a bearing portion of an armrest connected to a seatback at a furniture piece, the journal member comprising:
   a rigid body having a torque-bearing end and a connection end, the connecting end is adapted to be connected to the seatback of the furniture piece, the torque-bearing end is shaped to include at least one planar surface that is parallel to an interior wall of a hollow bearing portion, that is integrally cast to an armrest to reduce shear stress between the external surface of the journal member and the interior surface of the hollow bearing portion when force is applied to the armrest.

6. A rigid journal member according to claim 5, wherein the torque-bearing end has at least one indention with an arcuate surface.

7. A rigid journal member according to claim 5, wherein the torque-bearing end has three equally spaced planar surfaces formed in a first annular portion, each of the surfaces has an indention formed therein.

8. A rigid journal member according to claim 7, wherein the torque-bearing end has three equally spaced planar surfaces formed in a second annular portion, each of the surfaces in the second annular portion has an indention formed therein.

9. A rigid journal member according to claim 5, wherein the connecting end of the journal member includes at least one guide element.

10. A rigid journal member according to claim 9, wherein the torque-bearing end has three equally spaced planar surfaces formed in a first annular portion, each of the surfaces has an indention formed therein.

11. A rigid journal member according to claim 10, wherein the torque-bearing end has three equally spaced planar surfaces formed in a second annular portion, each of the surfaces in the second annular portion has an indention formed therein.

12. An armrest for a furniture piece comprising:
an arm having a hollow bearing portion with a rigid inner journal member, the journal member has a torque-bearing end and a connecting end, the connecting end is adapted to be rotatably connected to a seatback of a furniture piece so the arm may rotate relative to the seatback, and the torque-bearing end has three equally spaced planar surfaces formed in a first annular portion, each of the surfaces has an indention formed therein, each equally spaced planar surface is parallel to an interior wall of the bearing portion of the arm to reduce shear stress between the external surface of the journal member and the interior surface of the hearing portion when force is applied to the arm.

13. A rigid journal member according to claim 12, wherein the torque-bearing end of the journal member has three equally spaced planar surfaces formed in a second annular portion, each of the surfaces in the second annular portion has an indention formed therein.

\* \* \* \* \*